United States Patent [19]

Stavinoha et al.

[11] Patent Number: 4,895,908

[45] Date of Patent: Jan. 23, 1990

[54] CYCLOPENTADIENYLETHANOL AND BIS(2-HYDROXYETHYL)DICYCLOPENTADIENE ESTERS AND GRAFTS THEREOF ON CARBOXYL MODIFIED POLYOLEFINS

[75] Inventors: Jerome L. Stavinoha; Anthony W. McCollum, both of Longview, Tex.

[73] Assignee: Eastman Kodak Company, Rochester, N.Y.

[21] Appl. No.: 292,070

[22] Filed: Dec. 30, 1988

Related U.S. Application Data

[62] Division of Ser. No. 101,474, Sep. 28, 1987, Pat. No. 4,812,509.

[51] Int. Cl.$^4$ .................... C07C 69/78; C07C 69/03; C08F 265/04; C08F 265/02
[52] U.S. Cl. .................... 525/290; 560/106; 560/107; 560/231; 560/256
[58] Field of Search .............. 525/170, 290, 297; 560/106, 107, 231, 256

[56] References Cited

U.S. PATENT DOCUMENTS

| | | | |
|---|---|---|---|
| 2,817,673 | 12/1957 | Roelen et al. | 528/298 |
| 2,841,614 | 7/1958 | Buchner et al. | 528/298 |
| 2,912,447 | 11/1959 | Brannock | 560/256 |
| 2,927,934 | 3/1960 | Greenspan et al. | 560/256 |
| 3,005,775 | 10/1961 | Pethrick et al. | 560/194 |
| 3,219,697 | 11/1965 | Cox et al. | 528/74 |
| 3,524,890 | 8/1970 | Cox | 568/817 |
| 4,151,194 | 4/1979 | Wu et al. | 528/74 |
| 4,316,978 | 2/1982 | Kennedy et al. | 525/297 |
| 4,318,831 | 3/1982 | Klein et al. | 560/231 |
| 4,387,182 | 6/1983 | Friedli et al. | 525/170 |
| 4,528,396 | 7/1985 | Sanderson et al. | 560/256 |

FOREIGN PATENT DOCUMENTS

| | | |
|---|---|---|
| 934889 | 11/1955 | Fed. Rep. of Germany . |
| 60-60147 | 4/1985 | Japan . |
| 164257 | 8/1964 | U.S.S.R. . |

OTHER PUBLICATIONS

Schroder et al., J. Prakt. Chem., 315, p. 958, (1973).

*Primary Examiner*—Veronica P. Hoke
*Attorney, Agent, or Firm*—Thomas R. Savitsky; William P. Heath, Jr.

[57] ABSTRACT

Novel esters and polyesters are prepared by reacting cyclopentadienylethanol, bis(2-hydroxyethyl)dicyclopentadiene, or mixtures of the two with monobasic acid esters and dibasic acid diesters. These esters and polyesters are characterized by a reversible cross-linking mechanism and have utility as superior coatings and adhesives. High molecular weight, cross-linked polymers are also prepared in the present invention by reacting cyclopentdienylethanol with a polyolefin wax having an ester, acid or anhydride functional group.

7 Claims, No Drawings

CYCLOPENTADIENYLETHANOL AND BIS(2-HYDROXYETHYL)DICYCLOPENTADIENE ESTERS AND GRAFTS THEREOF ON CARBOXYL MODIFIED POLYOLEFINS

This is a divisional of application Ser. No. 101,474 filed on Sept. 28, 1987 now U.S. Pat. No. 4,812,509.

FIELD OF THE INVENTION

This invention relates to esters and polyesters derived from cyclopentadienylethanol and bis(2-hydroxethyl)-dicyclopentadiene, and a process for their preparation.

BACKGROUND OF THE INVENTION

Esters and polyesters are commonly used for a wide variety of purposes in the chemical arts. These compounds can be used as coatings, themosetting adhesives, and in many other applications. It is highly desirable to obtain esters and polyesters which can undergo reversible cross-linking reactions without liberating undesirable by-products. It is also desirable to have a method by which long-chain polymeric compounds can be cross-linked so as to further increase their molecular weight and viscosity.

SUMMARY OF THE INVENTION

It has been discovered that novel esters and polyesters are obtained by reacting monobasic acids, or their esters or anhydrides, or dibasic diacids, or their esters or anhydrides, with cyclopentadienylethanol (or "CPDE") which exists at ambient temperature as the dimer bis(2-hydroxyethyl)dicyclopentadiene (or "BHDP"). It is particularly preferred that CPDE or BHDP (or mixtures of the two) be reacted with mono- and dibasic esters to produce the novel esters and polyesters of the present invention. Because of the rapid dimerization of the cyclopentadienylethanol unit into BHDP, the esters and polyesters of the present invention have excellent cross-linking ability, and they will form cross-links without the addition of cross-linking agents. The compounds of the present invention are versatile and can be used in coatings, adhesives, and other applications.

In another aspect of the invention, CPDE can be used to prepare cross-linked high molecular weight polymers. These polymers are prepared by reacting CPDE (or BHDP) with a long-chain polyolefin containing functional group which are reactive with the hydroxyl group of the CPDE, namely esters, carboxylic acids, or anhydrides. Polyolefins cross-linked with CPDE in this way have increased viscosity and molecular weight, and can become rubberlike.

DETAILED DESCRIPTION OF THE INVENTION

The novel compositions of the present invention comprise esters and polyesters prepared from cyclopentadienylethanol which exists at ambient temperature as the Diels Alder dimer, bis(2-hydroxyethyl)dicyclopentadiene. One ester of the present invention has the formula:

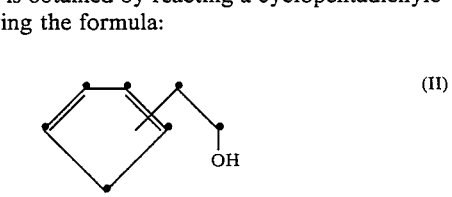

wherein R is an aliphatic or aromatic, branched or unbranched hydrocarbon of 1 to 20 carbon atoms. This compound is obtained by reacting a cyclopentadienylethanol having the formula:

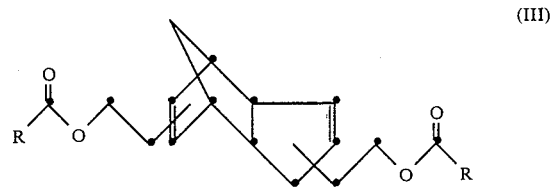

with a monobasic acid or its ester or anhydride. The preparation of CPDE has been previously reported in Schroder et al., *J. Prakt-Chem.* 315, 985 (1973). It is particularly preferred that a methyl ester of a monobasic acid be employed to obtain the compound of Formula I above. Examples of suitable methyl esters are methyl butyrate, methyl valeralate, methyl octanate, methyl linolenate, and methyl benzoate. This reaction should be carried out at temperatures above about 150° C., with 180° C. to 190° C. being preferred.

The compound of Formula I above will generally dimerize at ambient temperatures, forming a compound having the formula:

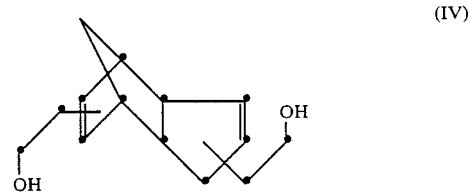

wherein R is as described in Formula I above. This dimer will be the primary form of the compound of Formula I when temperatures fall below about 150° C.

The compound of Formula III is also obtainable by reacting a BHDP having the formula:

(IV)

with a monobasic acid or its ester or anhydride. The preparation of BHDP has also been described in Schroder et al., referred to above. BHDP is a dimer of CPDE, and CPDE will normally be found in the form of BHDP at temperatures below around 150° C. The reaction producing Compound III above is particularly favored when BHDP is reacted with a methyl ester of a monobasic acid, such as described above.

In another aspect of the present invention, novel polyesters can be prepared which have the formula:

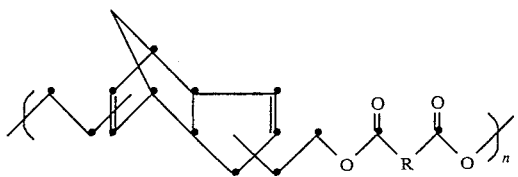

wherein R represents an aliphatic or aromatic, branched or unbranched hydrocarbon, and n is a whole number of at least 1. These polyesters are formed by reacting a dibasic acid or its esters or anhydrides with CPDE, BHDP, or mixture of the two. It is particularly preferred that a dibasic acid diester be used to combine with CPDE or BHDP to obtain the polyester of Formula V above. Suitable dibasic acid diesters include dimethyl adipate, dimethyl terephthalate, dimethyl succinate, dimethyl sebacate, dimethyl phthalate, dimethyl suberate, dimethyl malonate, dimethyl glutarate, and dimethyl pimelate.

Either CPDE, BHDP, or mixtures of the two can be used in this reaction since the products will contain the dicyclopentadienyl unit at room temperature. The course of the reaction is depicted as follows:

run to about 90% conversion as monitored by the amount of methanol collected. If desired, a suitable catalyst, such as dibutyltin oxide, can be used. The amount of BHDP used by weight generally should be greater than the amount of diester used. The BHDP to diester ratio should range from about 1:1 to about 1.5:1. It is also possible to further add a polyol, such as trimethylolpropane, in these polyesters if so desired to create additional functionality.

In the polyester of Formula V above, R represents an aliphatic or aromatic fragment which is branched or unbranched. Typically, in an aliphatic polyester according to the present invention, R equals $(CH_2)n^1$ where $n^1$ equals 1 to 12. Typical aromatic polyesters will comprise those wherein R is $C_6H_4$, and $C_{10}H_6$.

The polyesters of the present invention are more versatile than typical saturated aliphatic or aromatic polyesters in that they can crack at temperatures of 150° C. to 200° C. to lower molecular weight polyesters containing reactive cyclopentadiene groups. This reaction occurs as follows:

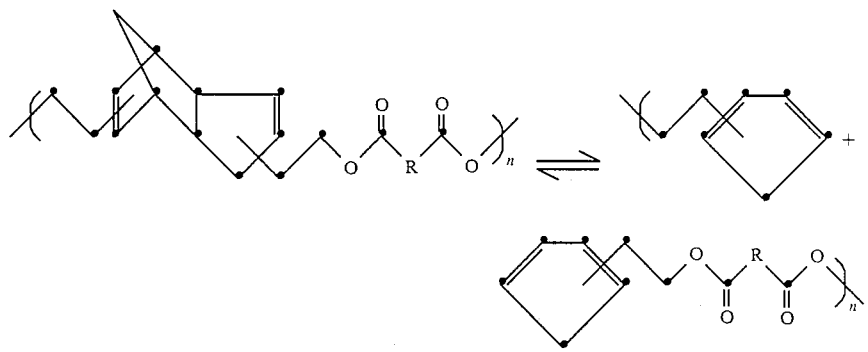

These polyesters thus have particular utility in applications that make use of the cyclopentadiene unit by reactions with dienophile which form higher molecular weight polymers.

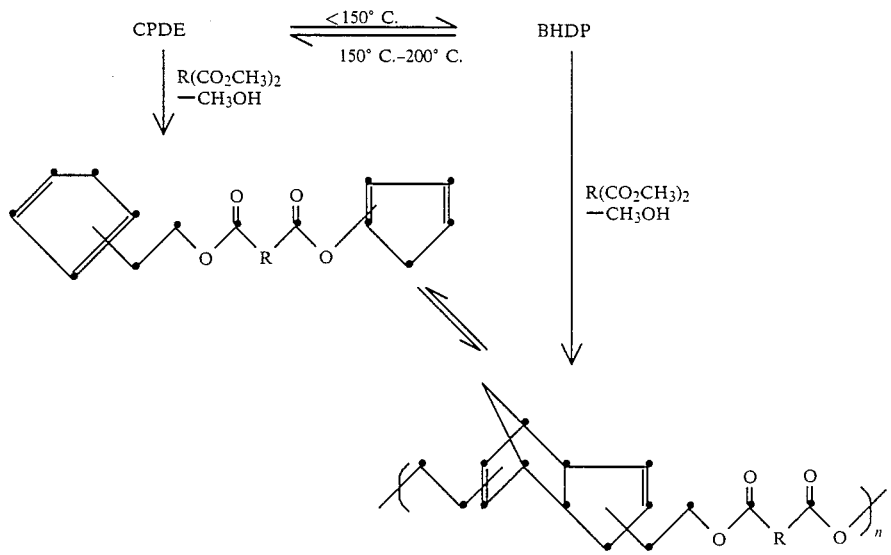

The reaction is preferably run at temperatures of 170° to 190° C. using a nitrogen sparge to assist in the removal of methanol overhead. The reactions should be The esters and polyesters of the present invention also have particular utility in coating and adhesive applications as a result of the cross-linking ability of the cyclopentadienyl grouping with active dienophiles. The dicyclopentadienyl moiety can undergo cross-linking reactions via a free radical process involving air oxidation. The compositions of the present invention have potential as coatings and thermoset hot-melt adhesives applications where the cross-linking reaction does not give off any by-products.

mers with functional groups that react with OH groups. The high molecular weight compound is prepared by reacting the long-chain polymer with a functional group such as an ester, acid, or anhydride, and then reacting this polymer with CPDE, BHDP or a mixture of the two so that a transesterification occurs.

As an example of this process, a polyolefin or polyolefin wax grafted with methyl crotonate is reacted with CPDE, and the following cross-linking reaction takes place with removal of methanol:

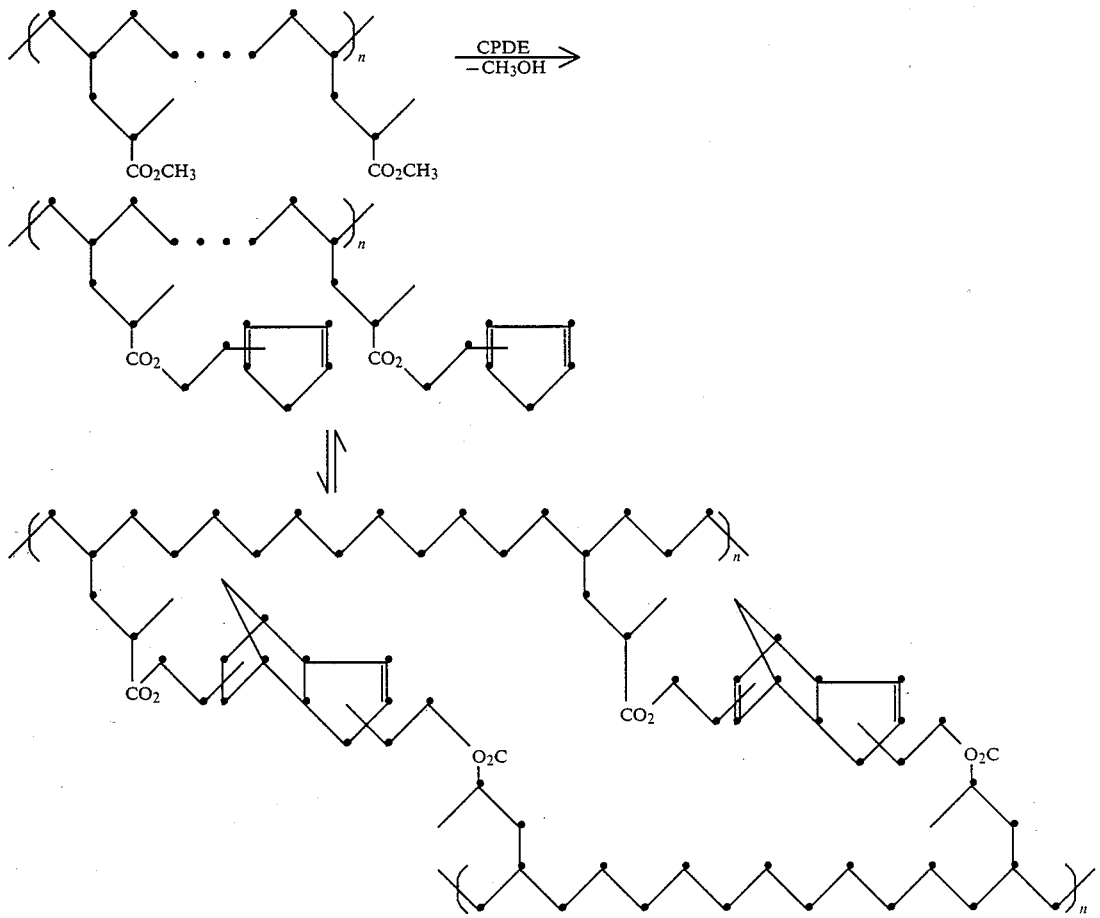

Coating compositions can be prepared by combining the polyesters of the present invention with a suitable solvent such as toluene and an acetate. A preferred solvent is a 70 to 30 percent solution of toluene and ethylene glycol monoethyl ether acetate. This coating solution can be spray applied upon an article and cured at 350° F. for about 20 minutes. Properties of some of the coatings prepared in accordance with the present invention are presented in Table I.

The polyesters of the present invention can also be made into thermoset adhesives. An adhesive polyester of the present invention was prepared from CPDE, trimethylolpropane, dimethyl terepthalate and dimethyl adipate. This adhesive gave a shear strength of 500 psi when applied between metal strips and cured at 350° F. for 30 minutes. Other adhesives of the present invention and their properties are listed in Table II.

In another aspect of the present invention, a cross-linked, high molecular weight compound having a pendant ester group can be prepared from long-chain poly-

TABLE I

Typical Coating Based Upon BHDP Polyesters

| Coatings | Thickness, Mil. | Cure, °F./ Min. | Pencil Hardness | Impact Resistance InLb. F/R[5] | Flexibility ⅛" Conical Mandrel | MEK[3] Double Rubs |
|---|---|---|---|---|---|---|
| BHDP Terephthalate | 0.4 | 350/20 | >2H | 160/160 | Pass | 250+ |
| BHDP Terephthalate | 0.6 | 350/20 | H | 160/160 | Pass | 250+ |
|  | 0.9 | 350/20 | H | 100/30 | Fail | 250+ |
| BHDP Adipate | 1.0 | 350/20 | F-H | 160/160 | Pass | 100 |

TABLE II

Adhesives[1] Based on BHDP Polyesters

| Sample | Cure, °F./Min. | Lap Shear Strength[2] psi |
|---|---|---|
| BHDP Adipate | 300/20 | 20 |
| BHDP-TMP[4] Adipate Terephthalate | 300/20 | 500 |
| BHDP-TMP Terephthalate | 350/20 | 200 |
| BHDP Terephthalate | 350/10 | 15 |

[1]Metal-to-metal adhesive bonds were prepared on sixteen gauge cold-rolled stainless steel strips.
[2]Lap shear strengths were measured according to ASTM D1002.
[3]MEK is methyl ethyl ketone.
[4]TMP is trimethylolpropane.
[5]F/R is foreward/reverse.

Modification of this wax with only 1 perent CPDE resulted in the formation of a wax having twice its original viscosity at 250° F. thus indicating an increased molecular weight due to cross-linking as depicted above. Higher amounts of CPDE (greater than or equal to 2 percent) result in rubberlike products due to the large increase in the molecular weight of the product.

The following examples are illustrative of the present invention and are presented to more clearly show the principles and practice of the invention.

EXAMPLE 1

Poly (BHDP Terephthalate)

Into a 4-necked, 1-liter flask fitted with a mechanical stirrer, thermometer, $N^2$ ebulator, and steam jacketed column packed with Berl Saddles and topped with a Dean-Stark trap and condenser were charged dimethyl terephthalate (220 grams, 1.14 moles), BHDP (300 grams, 1.36 moles), and dibutyltin oxide (1.4 grams). The mixture was heated at 180° to 190° C. for 5.5 hours. A conversion of 94 percent was effected based upon methanol distilled overhead. The yellow glass (viscosity 40,000 cp at 200° F.) had an average molecular weight of 2,060, an acid number of 1.2, and a hydroxyl number of 51.3.

EXAMPLE 2

Poly (BHDP Adipate)

Into the resin cook apparatus described above were charged dimethyl adipate (200 grams, 1.15 moles), BHDP (302 grams, 1.37 moles), and dibutyltin oxide (1.0 gram). The mixture was heated at 180° C. for 4 hours. A conversion of 93 percent was obtained based upon the methanol taken overhead. The tacky polyester had an average molecular weight of 1,974, an acid number of 2.4, and a hydroxyl number of 50.0.

EXAMPLE 3

Poly (BHDP Terephthalate)

Into a 3-necked, 250-mL flask fitted with a mechanical stirrer, Dean-Stark trap with condenser, and thermometer were charged dimethyl terephthalate (60 grams, 0.31 mole), BHDP (74.1 grams, 0.34 mole), and dibutyltin oxide (0.14 gram). The mixture was heated at 180° C. for 1 hour under $N_2$. Heating was continued for 1 hour at 180° C. under slight vacuum (100 mm Hg). A conversion of about 83 percent was obtained based on the methanol distilled overhead. The yellow glass had an average molecular weight of 2,282.

EXAMPLE 4

CPDE Modified Wax

A mixture of 20 grams of ethylene/propylene wax modified with methyl crotonate, BHDP (0.2 gram) and dibutyltin oxide (0.060 gram) was reacted at 170° to 175° C. for 1.5 hours. The viscosity of the wax (3,785 cp at 250° F.) was approximately twice that of the original material (1,922 cp at 250° F.).

EXAMPLE 5

Polyester Based on Trimethylolpropane, Dimethyl Terephthalate, Dimethyl Adipate, and BHDP Into a 3-necked, 1,000-mL flask fitted with a mechanical stirrer, Dean-Stark trap with condenser, and thermometer were charged dimethyl terephthalate (147 grams, 0.75 mole), dimethyl adipate (130.5 grams, 0.75 mole), trimethylolpropane (60 grams, 0.45 mole), and dibutyltin oxide (0.65 gram). The mixture was heated at 170° to 180° C. under $N_2$ for 2.25 hours. Heating was continued for 30 minutes at 180° C. under slight vacuum (100 mm Hg). A conversion of about 83 percent was obtained based on methanol taken overhead. To this mixture were added BHDP (207 grams, 0.94 mole) and 0.1 gram of additional dibutyltin oxide. This mixture was heated at 180° C. for 1.25 hours under $N^2$ and then under a slight vacuum (100 mm Hg) for 45 minutes. A conversion of 80 percent was obtained based on the methanol taken overhead. The rubberlike product had a hydroxyl number of 51.7.

What we claimed is:

1. A compound of the formula:

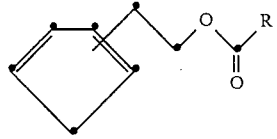

wherein R represents an aliphatic or aromatic, branched or unbranched hydrocarbon of 1 to 20 carbon atoms.

2. A compound of the formula:

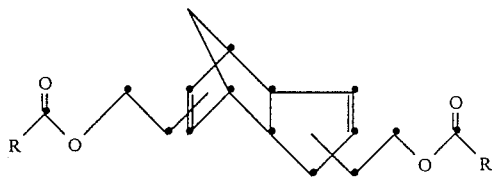

wherein R represents an aliphatic or aromatic, branched or unbranched hydrocarbon of 1 to 20 carbon atoms.

3. A method for the preparation of the compound of claim 1 which comprises reacting a cyclopentadienylethanol of the formula:

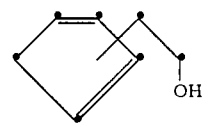

with a monobasic acid or its ester or anhydride.

4. A method for the preparation of the compound of claim 2 which comprises reacting a bis-(2-hydroxyethyl)dicyclopentadiene of the formula:

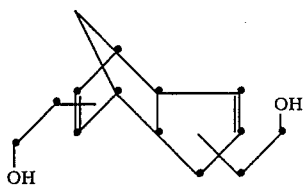

with a monobasic acid or its ester or anhydride.

5. A process for preparing a cross-linked, high molecular weight compound which comprises reacting:
 (a) a polyolefin having a functional group selected from the group consisting of esters, acids and anhydrides; and
 (b) a compound selected from the group consisting of cyclopentadienylethanol, bis(2-hydroxyethyl)dicyclopentadiene, and mixtures thereof.

6. A process as claimed in claim 5 wherein the polyolefin functional group comprises a methyl crotonate graft.

7. A product of the process of claim 5.

* * * * *